AUTOMATIC RANGE CHANGING CIRCUIT

Filed Feb. 9, 1968 2 Sheets-Sheet 1

INVENTOR
JOHN D. McGHEE,

BY

AGENT

Nov. 10, 1970 J. D. McGHEE 3,539,936

AUTOMATIC RANGE CHANGING CIRCUIT

Filed Feb. 9, 1968 2 Sheets-Sheet 2

INVENTOR
JOHN D. McGHEE,

BY Robert A. Lester
AGENT

United States Patent Office 3,539,936
Patented Nov. 10, 1970

3,539,936

AUTOMATIC RANGE CHANGING CIRCUIT

John D. McGhee, Plymouth Meeting, Pa., assignor to E. I. du Pont de Nemours and Company, Wilmington, Del., a corporation of Delaware Filed Feb. 9, 1968, Ser. No. 704,444
Int. Cl. H03g 3/30; H03k 21/00
U.S. Cl. 330—29 7 Claims

ABSTRACT OF THE DISCLOSURE

An automatic range changing circuit for attenuating stepwise, preferably, by powers of 10, the voltage output of a current-to-volts amplifier subjected to, for example, a pulse-shaped analog input signal, comprising:

a number of feedback circuits connected in parallel across the amplifier, each including a resistor and a transistor connected in series, and an actuating circuit for sensing the magnitude of the voltage at the output of the amplifier and for causing the transistors of the feedback circuits to sequentially conduct as the analog input signal increases in magnitude. The actuating circuit, preferably, consists of a pulse generator which produces a sharp pulse each time the output voltage reaches a predetermined magnitude and a logic circuit, having a plurality of nand gates, whose outputs are adapted to cause the transistors to conduct in response to the sharp pulses from the pulse generator. As each transistor conducts, an additional resistance is shunted across the amplifier, thereby decreasing the total feedback resistance and, necessarily attenuating the output of the amplifier.

CROSS REFERENCE TO RELATED APPLICATIONS

This invention is particularly related to the subject matter of application Ser. No. 704,445, filed on the same day, entitled Energy Sensing Device by inventors Raymond W. Tabeling and John D. McGhee, in that the instant invention may be used in the system described and claimed therein to attenuate the output of a current-to-volts amplifier. This cross reference is merely illustrative and not intended to restrict the scope and/or use of either invention.

Often a condition or quantity to be measured has a wide range of variation. Therefore, it may be necessary to employ a measuring instrument having a number of different scales. Manual control of scales of a measuring instrument is, of course, slow and subject to human error. Further, a rapid change to a higher scale is often required in order to protect the instrument.

The present invention is an automatic range changing circuit, adapted to rapidly attenuate, stepwise, the output signal of an amplifier whose input is an analog signal of varying amplitude, which comprises:

at least one feedback circuit, including a resistance and an electronic switch connected in series, coupled between the input and output of said amplifier, and actuating means coupled between the output of said amplifier and said electronic switch, said actuating means adapted to turn on said electronic switch whenever the output signal reaches a predetermined magnitude thereby allowing a signal feedback between the output and input of said amplifier through said resistance.

For a better understanding of the invention reference is made to the following detailed description and the attendant drawings wherein.

Although this invention can be employed to attenuate almost any analog signal of varying amplitude, it is particularly suited for use in an instrument designed to measure the peak amplitude of a pulse-shaped analog signal. Such an instrument, for example, is described in U.S. patent application S.N. 704,445 entitled Energy Sensing Device, filed on the same date, by R. W. Tabeling and J. D. McGhee.

Figure 1:
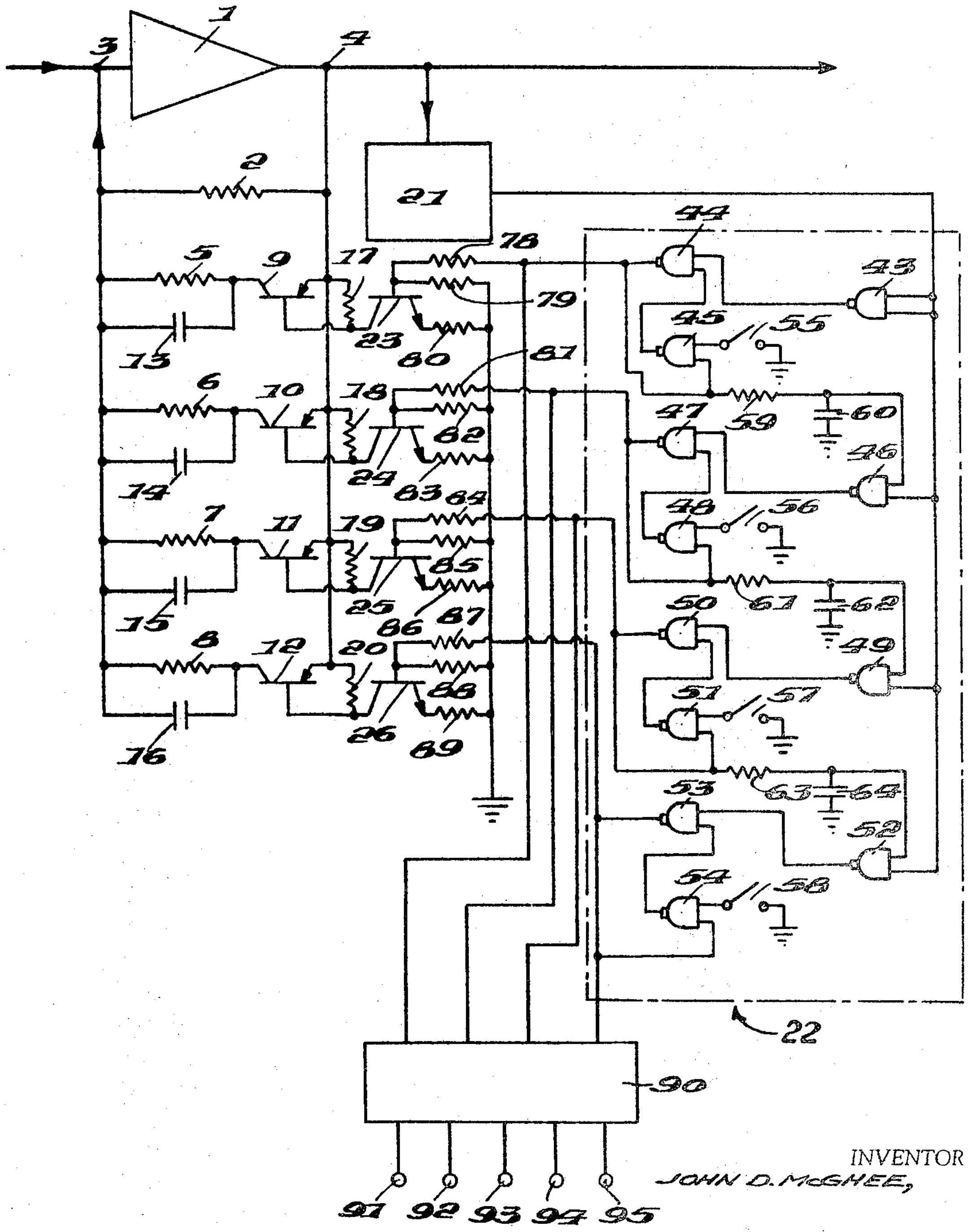
FIG. 1 illustrates one embodiment of the present invention.

As illustrated in FIG. 1, amplifier 1 has resistor 2 coupled between its input and output terminals, 3 and 4, respectively. This amplifier is, preferably, a typical operational amplifier. Because of the extremely high gain of an operational amplifier and its 180° phase shift, the potential at terminal 3 can be considered essentially zero. The result is that amplifier 1 functions as a current-to-volts amplifier, with the voltage output being equal to the current input times the feedback resistance.

For a given current input, the voltage output may be attenuated or decreased by lowering the total feedback resistance. Accordingly, in the present invention, a plurality of feedback circuits, including resistors 5, 6, 7 and 8 and switching transistors 9, 10, 11 and 12, are coupled between terminals 3 and 4. While any number of feedback circuits can be incorporated, for convenience, only four are shown. When negative signals are applied to the bases of switching transistors 9, 10, 11 and 12, resistors 5, 6, 7 and 8 are, respectively, shunted to output terminal 4. Capacitors 13, 14, 15 and 16, in parallel with resistors 5 through 8, provide a phase leads to dampen oscillations and, on the lower ranges, are helpful in reducing noise. Resistors 17, 18, 19 and 20, respectively coupled between the emitters and bases of switching transistors 9 through 12, serve as "guaranteed turns-offs" when the negative signals are removed from the bases of the switching transistors.

The output of amplifier 1 is directly connected to an actuating means which preferably comprises pulse generator 21 coupled to output terminal 4, logic circuit means 22 connected to pulse generator 21, and four switching means, that include transistors 23, 24, 25 and 26, serially coupled between logic circuit means 22 and switching transistors 9, 10, 11 and 12.

Figure 2:
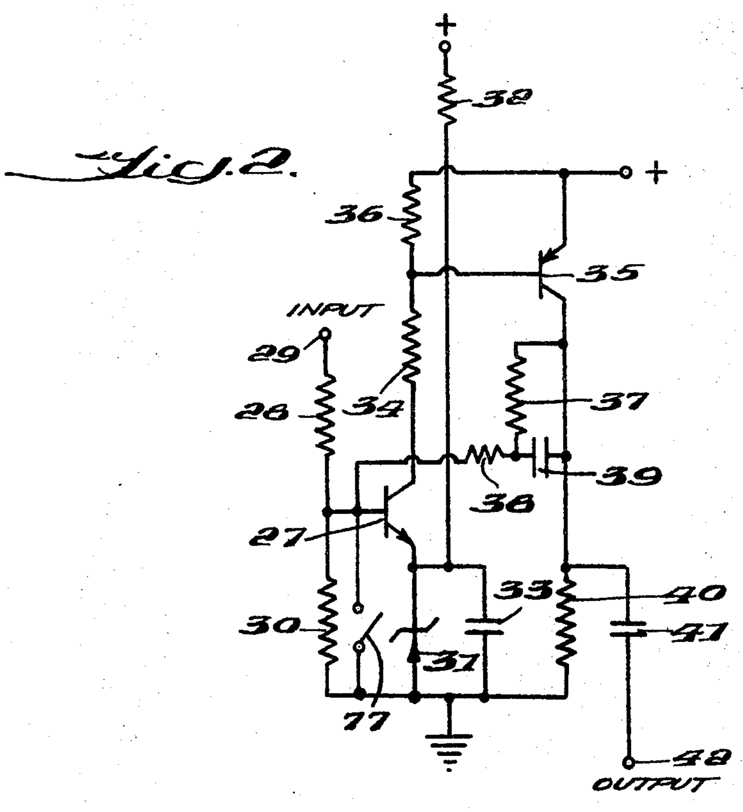
FIG. 2 shows one form of pulse generating means which can be used in the embodiment of FIG. 1.

A typical pulse generator which can be incorporated in the present invention is illustrated in FIG. 2. In this figure, the base of transistor 27 is fed with an input signal via resistor 28 and terminal 29. The base of transistor 27 is connected to ground by means of resistor 30. Transistor 27 is preset to conduct, only when the input signal reaches a certain voltage level, by Zener diode 31, connected between emitter and ground. The upper end of Zener diode 31 is coupled to a positive unregulated voltage supply by resistor 32. Zener diode 31 is held at a constant voltage drop by resistor 32. Capacitor 33 is used to provide a low A.C. impedance to the spike generated by the pulse generator. When transistor 27 conducts, it pulls current through resistor 34, turning on transistor 35. Transistor 35 has its emitter connected directly and its base, indirectly via resistor 36 to a second positive voltage supply. The output of transistor 35 then feeds back through a snap-acting circuit, consisting of resistors 37 and 38, causing transistor 27 to conduct more heavily, thus giving positive rapid switching. To eliminate chatter problems due to noise, capacitor 39 is connected across resistor 37. The output of transistor 35 is taken off just above resistor 40 and fed to capacitor 41 which generates a sharp positive pulse at terminal 42. Switch 77 allows the pulse generator to be turned-off by shunting the base of transistor 27 to ground.

Returning to FIG. 1, the output of pulse generator 21 is coupled to the input of logic circuit means 22, which comprises a plurality of dual input nand gates, 43 through 54, segregated into four gating circuits; four resetting means, 55, 56, 57 and 58 and three time delay means, including, respectively, resistor 59 and capacitor 60, resistor 61 and capacitor 62, and resistor 63 and capacitor 64.

Figure 3:
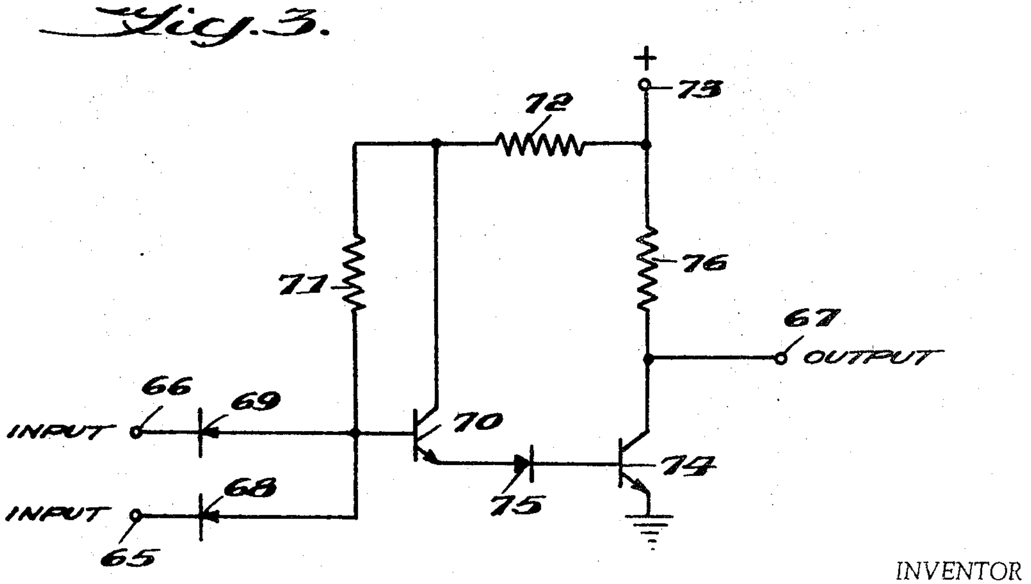
FIG. 3 depicts a typical nand gate which also can be used in the embodiment of FIG. 1.

To best understand the operation of a nand gate, reference is made to FIG. 3, showing a common nand gate having dual inputs 65 and 66 and a single output 67. Inputs 65 and 66 are connected via diodes 68 and 69 to the base of transistor 70 and through resistors 71 and 72 to positive voltage supply 73. Normally, diodes 68 and 69 are conductive in the forward direction so that inputs 65 and 66 are essentially at zero or ground potential. With inputs 65 and 66 at ground, transistor 70 is turned off. If, for instance, a positive pulse greater than the potential of voltage supply 73 is applied at input 65, diode 68 is reversed-biased becoming nonconductive. Transistor 70 remains off, since diode 69 still produces the initial voltage drop across resistors 71 and 72. Only, if both inputs are simultaneously driven positive, does the current through resistor 71 try to go to zero, thereby raising the base potential of transistor 70. This turns on transistor 70 which drives transistor 74 into saturation via diode 75. When transistor 70 and, consequently, transistor 74, are turned off, no current flows through resistor 76, leaving output 67, connected between resistor 76 and transistor 74, at the potential of voltage supply 73. However, when transistor 74 drives into saturation, output 67 snaps down to ground. Thus, we see that output 67, generally at a fixed positive voltage level, is zeroed only when inputs 65 and 66 are subjected to coincident, positive voltages. This zeroed condition exists only for the duration of the coincident inputs.

For simplicity and convenience, all of the nand gate of FIG. 1 are preferably adapted to operate between the same two fixed voltage levels, hereinafter designated as the higher and lower levels. As previously indicated, nand gates 43 through 54 are divided by function into four gating circuits, each having three nand gates; the first gating circuit comprising nand gates 43, 44 and 45; the second, nand gates 46, 47 and 48; the third, nand gates 49, 50 and 51; and the fourth, nand gates 52, 53 and 54. In the first gating circuit, the dual inputs and the output of nand gate 43 are directly connected to pulse generator 21 and one input of nand gate 44, respectively. Nand gates 44 and 45 are coupled to each other such that the output of each feeds an input of the other. The remaining input of nand gate 45 is connected to resetting means 55, illustrated as a switch operating between open and ground.

Assuming that the first gating circuit has been reset by briefly switching resetting means 55 to ground, the operation of the circuit will be as follows. Initially, with resetting means 55 in the open position and in the absence of an output from pulse generator 21, the outputs of nand gates 43 and 45 are at the higher level. Consequently, the output of nand gate 44 is at the lower level. A positive pulse from pulse generator 21 then drives the output of nand gate 43 negative. The output of nand gate 44 then goes positive, forcing the output of nand gate 45 negative. Thus, the output of nand gate 44 is locked at the higher level until resetting means 55 is switched to ground. The second gating circuit is identical to the first gating circuit, except that only one input of its first nand gate, nand gate 46, is connected directly to pulse generator 21. The other input is coupled to the output of the first gating circuit, i.e., the output of nand gate 44, through a first time delay means which comprises resistor 59 and grounded capacitor 60. The first time delay means prevents the output of the second gating circuit (the output of nand gate 47) from going positive in response to the first pulse, providing, of course, that the circuit was initially reset. Without the time delay means, the output of the first gating circuit would drive one input of nand gate 46 positive while the positive pulse was still present in the other input.

The third and fourth gating circuits are identical to the second gating circuit with time delay means positioned between each. With all four gating circuits initially reset to the lower level output by resetting means 55, 56, 57 and 58, a first pulse from pulse generator 21 drives the output of the first gating circuit positive, a second pulse drives the output of the second gating circuit likewise, and so on. The outputs of all the gating circuits remain at the higher level until reset.

The voltage outputs of the four gating circuits feed four switching means. The four switching means provide constant turn-on currents to the bases of switching transistors 9, 10, 11 and 12 only when the outputs of the gating circuits are at the higher voltage level. The first of the gating circuits comprises transistors 23 and resistors 78, 79 and 80; the second, transistor 24 and resistors 81, 82, and 83; the third, transistor 25 and resistors 84, 85 and 86; and the forth, transistor 26 and resistors 87, 88 and 89. By connecting equal resistors between the base and ground, and the emitter and ground of transistors 23 through 26, each of the transistors operates as a current switch. This lets transistors 9 through 12 be turned on by constant currents, thereby giving linear results.

An auxiliary, but often necessary, piece of equipment, range indicating means 90 is adapted to turn on range lights 91, 92, 93, 94 and 95 as the voltage output is sequentially attenuated. Indicating means 90 is representatively shown connected to the outputs of the gating circuits. As readily apparent to one skilled in the art, such a design can be connected in numerous ways. In a preferred embodiment only one range light turns or for each range. For example, range light 91 turns on when the only feedback between terminals 3 and 4 of amplifier 1 is through resistor 2; range light 92 turns on (and range light 91 turns off) when the feedback is through resistors 2 and 5; etc. The range lights can be neon, incandescent or other types of lamps.

In one embodiment of the invention presently being used, the overall operation was as follows. The feedback resistors 2, 5, 6, 7 and 8 had values of 500 meg., 55.6 meg., 556K and 55.6 ohms, respectively. As switching transistors 9 through 12 were sequentially turned on, the change in total feedback resistance attenuated the voltage output by a power of ten each time. Pulse generator 21 was set to pulse whenever the output voltage of amplifier 1 reached 10 volts. Thus, the voltage output of amplifier 1 represented 0–20 na., 0–200 na., 0–2 $\mu$a., 0–20 $\mu$a. and 0–200 $\mu$a. The gating circuits were adapted to operate between +9 volts and ground. Initially each was reset to ground. A pulse-shaped analog signal having a maximum amplitude of 100 $\mu$a. was then applied to the input of amplifier 1. (Range light 91 lit up.) When the output rose to 10 volts, pluse generator 21 generated a sharp pulse This pulse tripped the first gating circuit to the 9-volt output level, causing transistor 23 to turn on transistor 9. With transistor 9 switched on, resistor 5 is shunted to terminal 4, changing the output of amplifier 1 from 10 volts to 1 volt. The 9-volt output of the first gating circuit additionally turned on range light 92 and turned off range light 91. When the output of amplifier 1 again reached 10 volts, the generated pulse drove the output of the second gating circuit positive, turning on transistors 24 and 10, thereby shunting resistor 6 to terminal 4. At the same time range light 92 turned off and range light 93 turned on. As the pulse-shaped analog input continued to rise, the remaining two resistors, 7 and 8, were shunted to the output of amplifier 1, with a corresponding indication by range light 94 and 95. The peak amplitude of the amplifier was recorded as 5 volts by an appropriate measuring instrument connected to terminal 4. This represented an unattenuated output of $5\times10^4$ or 50,000 volts. Each of the gating circuits was reset prior to introducing additional analog input signals.

It will be seen that there has been described a versatile and rapid-acting automatic scale changing apparatus primarily for use with instruments for measuring varying-amplitude analog signals. While the invention was described with the use of means to reset the scale to the very lowest scale upon removal of the analog input signal, it will be readily appreciated that the decrease in scale can be accomplished step-by-step, similar to the described step-by-step increase in scale. Also, though the invention was illustrated and described as having five ranges, any number of ranges can be employed depending upon the needs of the designer.

It will be understood that various changes in the details, materials, steps, and arrangement of parts, which have been herein described and illustrated, may be made by those skilled in the art within the principle and scope in the invention.

I claim:

1. An automatic range changing circuit for attenuating an output signal of an amplifier subject to an input signal, a portion of which is of increasing magnitude, comprising:
- (a) a plurality of feedback circuits, each including a resistor and an electronic switch connected in series, coupled between the input and output of said amplifier;
- (b) pulse generating means, coupled to the output of said amplifier, and adapted to generate a sharp pulse whenever the voltage output of said amplifier reaches a predetermined magnitude;
- (c) logic circuit means connected to said pulse generating means, said logic circuit means comprising (1) a plurality of gating circuits adapted in a manner such that each of said pulses causes the output of successive gating circuits to switch from a first voltage level to a second voltage level and (2) a plurality of time delay means for delaying the passage of a portion of the signal generated when the output of each of said gating circuits switches to said second voltage level, each of said gating circuits having a pair of inputs and a single output, each of said gating circuits being disposed in a manner such that its output is connected to the input of the subsequent gating circuits through one of said time delay means, and each of said gating circuits being adapted in a manner such that both inputs of the first of said gating circuits and the second input of each of the other of said gating circuits is connected to said pulse generating means; and
- (d) a plurality of switching means, each connected between the output of one of said gating circuits associated therewith and one of said feedback circuits associated therewith, said switching means being adapted to supply constant current to the electronic switch in the associated feedback circuit when the output of the associated gating circuit is at the said second voltage level, thereby causing said electronic switch to go from a non-conducting to a conducting state whereby the voltage output of said amplifier is attenuated stepwise in response to an input signal of increasing magnitude.

2. The automatic range changing circuit of claim 1 wherein said electronic switch is a transistorized switch.

3. The automatic range changing circuit of claim 1 wherein said logic circuit means additionally includes a plurality of resetting means connected to each of said gating circuits for resetting the output of said gating circuit to said first voltage level.

4. The automatic range changing circuit of claim 1 wherein each of said gating circuits comprises three nand gates, each having a pair of inputs and a single output; said nand gates being disposed in a manner such that a first input of a first of said nand gates is connected to said pulse generating means, the output of said first nand gate is connected to a first input of a second of said nand gates, the output of said second nand gate is connected to a first input of the third of said nand gates and to one of said associated switching means, and the output of said third nand gate is connected to a second input of said second nand gate; the first of said gating circuits additionally having the second of its first nand gate connected to said pulse generating means and each of the remaining gating circuits additionally having the second input of its first nand gate connected through one of said time delay means to the first input of the third nand gate of the immediately preceding gating circuit.

5. The automatic ranges changing circuit of claim 4 wherein each gating circuit further comprises resetting means for resetting the signal at the output of said second nand gate, said resetting means being connected to a second input of said third nand gate.

6. A logic circuit means for providing $n$ electrical signals at a fixed voltage level for a determined period of time in resonse to $n$ electrical sharp pulses produced by a pulse generating means, $n$ being any positive integer, comprising: $n$ gating circuits adapted to provide an electrical signal at a fixed level in response to said electrical pulses; and $n-1$ time delay means for delaying the passage of a portion of the signal generated when the output of each of said gating circuits produces an electrical signal at said fixed voltage level; each of said gating circuits being comprised of three nand gates, each having a pair of inputs and a single output; said nand gates being disposed in a manner such that a first input of a first of said nand gates is connected to said pulse generating means, the output of said first nand gate is connected to a first input of a second of said nand gates, the output of said second nand gate is connected to a first input of a third of said nand gates, and the output of said third nand gate is connected to a second input of said second nand gate; the first of said gating circuits additionally having the second input of its first nand gate connected to said pulse generating means, each of the remaining gating circuits additionally having the second input of its first nand gate connected through one of said time delay means to the first input of the third nand gate of the immediately preceding gating circuit, and the inputs of each of said first nand gates that are connected to said pulse generating means and outputs of each of the second nand gates being, respectively, the inputs and outputs of each of said gating circuits.

7. The logic circuit means of claim 6 wherein each of said gating circuits further comprises resetting means for resetting the signal at said output of said second nand gate to another fixed voltage level, said resetting means being connected to a second input of said third nand gate.

References Cited

UNITED STATES PATENTS

| | | | |
|---|---|---|---|
| 3,083,305 | 3/1963 | Maley | 307—215 X |
| 3,308,392 | 3/1967 | McCarter | 330—144 |
| 3,315,223 | 4/1967 | Hibbard et al. | 340—15.5 |
| 3,376,557 | 4/1968 | Godinez. | |

ROY LAKE, Primary Examiner

J. B. MULLINS, Assistant Examiner

U.S. Cl. X.R.

307—223, 229; 330—86, 110